No. 766,307. PATENTED AUG. 2, 1904.
F. E. WILCOX.
VEHICLE GEAR.
APPLICATION FILED FEB. 25, 1904.
NO MODEL.
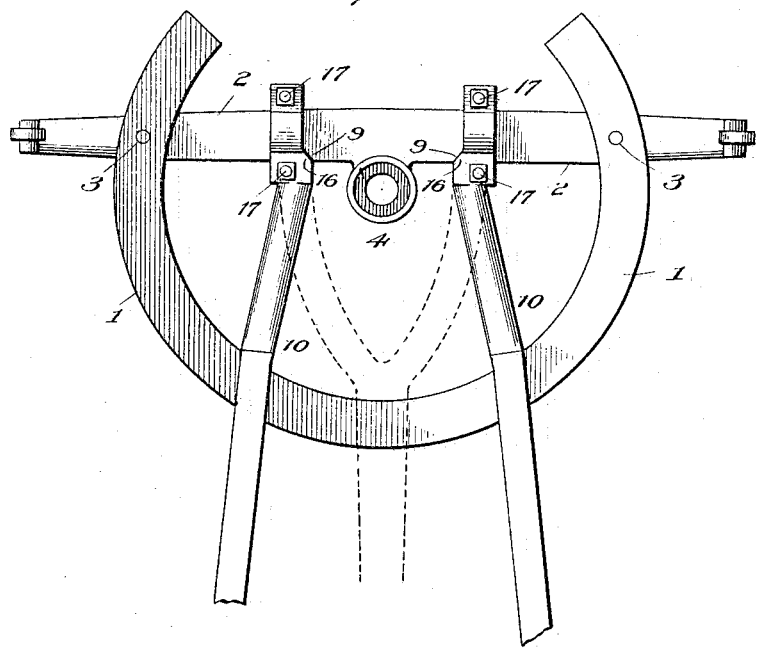
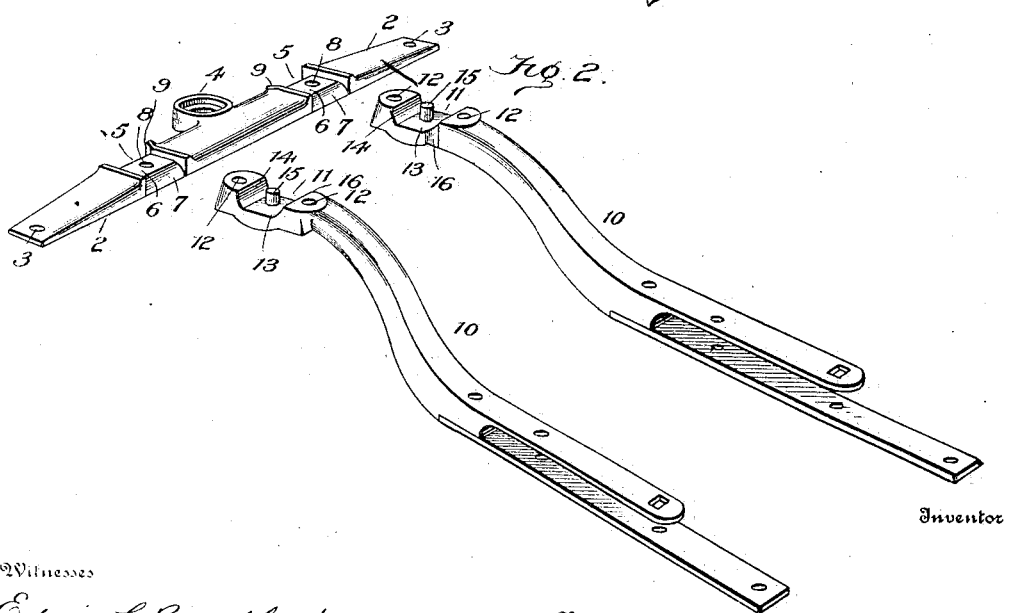
Witnesses
Edwin L. Bradford
Geo Thom
Inventor
By F. E. Wilcox,
F. E. Stebbins, Attorney.

No. 766,307. Patented August 2, 1904.

UNITED STATES PATENT OFFICE.

FRANK E. WILCOX, OF MECHANICSBURG, PENNSYLVANIA.

VEHICLE-GEAR.

SPECIFICATION forming part of Letters Patent No. 766,307, dated August 2, 1904.

Application filed February 25, 1904. Serial No. 195,164. (No model.)

*To all whom it may concern:*

Be it known that I, FRANK E. WILCOX, a citizen of the United States, residing at Mechanicsburg, in the county of Cumberland and State of Pennsylvania, have invented new and useful Improvements in Vehicle-Gears, of which the following is a specification.

My invention relates to fifth-wheels for vehicles, and especially to the head-block plate and the reach or perch iron or irons, the object being the provision of means for uniting the head-block plate and the perch iron or irons in such a manner that a rigid connection or joint or joints shall be formed and the parts united so one cannot move relative to the other.

With this end or purpose in view my invention consists in certain novelties of construction and combinations of parts, as hereinafter set forth and claimed.

The accompanying drawings illustrate an example of the physical embodiment of my invention constructed according to the best mode I have so far devised for the practical application of the principle.

Figure 1 is a bottom plan view of the upper circular member of a fifth-wheel proper, head-block plate, and reach-irons. Fig. 2 shows in perspective views of the reach-irons and a bottom view of the head-block plate, the latter being adapted to be turned over and engage the recesses in the ends of the reach-irons.

Referring to the figures, the numeral 1 designates the upper circular member of the fifth-wheel; 2, the head-block plate; 3, bolt-holes for the reception of bolts which unite the ends of the fifth-wheel member to the ends of the head-block plate; 4, a perforated lug at the rear edge of the plate to receive a king-bolt; 5, recesses in the under surface of the head-block plate to recive the ends of the reach or perch irons; 6, central flat or plain surfaces in the recesses; 7, curved or angular surfaces each side of the flat surfaces; 8, holes in the flat surfaces; 9, angular surfaces inclined toward the king-bolt lug; 10, the arms of the reach or perch iron or irons; 11, recesses in the top surfaces of the arms near their ends; 12, holes for the passage of clips which unite the reach-irons, head-block plate, and head-block; 13, flat surfaces at the bottom of the recesses, which surfaces match the flat surfaces 6 in the recesses of the head-block plate; 14, curved or angular surfaces which match the curved or angular surfaces 7 in the recesses of the head-block plate; 15, bosses projecting from the flat surfaces 13 and adapted to frictionally engage the holes 8 in the flat surfaces in the recesses of the head-block plate; 16, offsets on the arms which engage the angular surfaces 9 at the rear edges of the recesses in the head-block plate, and 17 are the bolt ends of the clips which unite the head-block, head-block plate, and the arms of the reach iron or irons.

From the foregoing description, taken in connection with the drawings, it becomes obvious that I have provided means for rigidly and securely connecting the head-block plate and arms of the reach iron or irons in fifth-wheel gears and which fulfils all the conditions set forth as the object of my invention.

I have shown in full lines two reach-irons or arms disconnected; but, as indicated in dotted lines, Fig. 1, the two arms may be united to form a single reach-iron. Slight changes in construction may of course be introduced in the application of the principle, such as the interchange of the bosses and holes and the location of the hole for the king-bolt, without constituting substantial departures.

What I claim as new, and desire to secure by Letters Patent, is—

1. The combination in a vehicle-gear, of a head-block plate having recesses in its under surface, and the arms of a perch-iron or perch-irons with recesses matching the recesses in the under surface of the head-block plate; the said arms and head-block plate interlocking by means of a boss and hole at each point of connection.

2. The combination in a vehicle-gear, of a head-block plate having recesses in its under surface, each recess being provided with a central flat surface and inclined surfaces each side of the central flat surface; and the arms of a perch-iron or perch-irons, said arms each being provided with a recess matching one of the recesses in the under surface of the head-block plate; the said arms and head-block plate interlocking by means of holes and bosses.

3. The combination in a vehicle-gear, of a head-block plate having recesses in its lower surface, and a hole in the surface of each recess; and the arms of a perch-iron or perch-irons each provided with a recess matching a recess in the lower surface of the head-block plate, and with a boss to enter the hole in the surface of the said recess.

4. The combination in a vehicle-gear, of a head-block plate; the arms of a reach-iron or reach-irons; said arms being perforated; and clips with bolt ends passed through the perforations in the arms; the said arms and head-block plate interlocking at their meeting surfaces by means of bosses and holes.

In testimony whereof I affix my signature in presence of two witnesses.

FRANK E. WILCOX.

Witnesses:
J. F. BRICKER,
F. R. PEEKMAN.